United States Patent
Ueda et al.

(10) Patent No.: US 9,945,760 B2
(45) Date of Patent: Apr. 17, 2018

(54) TIRE HOLDING APPARATUS AND TIRE INSPECTION SYSTEM PROVIDED WITH SAID TIRE HOLDING APPARATUS

(71) Applicant: MITSUBISHI HEAVY INDUSTRIES MACHINERY SYSTEMS, LTD., Hyogo (JP)

(72) Inventors: Tatsuya Ueda, Hiroshima (JP); Makoto Tachibana, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 116 days.

(21) Appl. No.: 14/911,265

(22) PCT Filed: Dec. 4, 2014

(86) PCT No.: PCT/JP2014/082152
§ 371 (c)(1),
(2) Date: Feb. 9, 2016

(87) PCT Pub. No.: WO2015/162818
PCT Pub. Date: Oct. 29, 2015

(65) Prior Publication Data
US 2016/0187229 A1 Jun. 30, 2016

(30) Foreign Application Priority Data

Apr. 22, 2014 (JP) ................................ 2014-088197

(51) Int. Cl.
*B60C 25/00* (2006.01)
*G01M 17/02* (2006.01)
(Continued)

(52) U.S. Cl.
CPC ............ *G01M 17/021* (2013.01); *B60C 19/00* (2013.01); *B60C 25/002* (2013.01); *G01M 1/02* (2013.01)

(58) Field of Classification Search
None
See application file for complete search history.

(56) References Cited

U.S. PATENT DOCUMENTS 3,677,320 A * 7/1972 Corless ................. B60C 25/145
157/1.1
4,852,398 A * 8/1989 Cargould ............ G01M 17/021
73/146

(Continued)

FOREIGN PATENT DOCUMENTS

CN 102161337 A 8/2011
CN 102803920 A 11/2012
(Continued)

OTHER PUBLICATIONS

International Search Report in International Application No. PCT/JP2014/082152, dated Mar. 10, 2015.
(Continued)

*Primary Examiner* — Jill Culler
(74) *Attorney, Agent, or Firm* — Kanesaka Berner and Partners LLP

(57) ABSTRACT

A tire holding apparatus is provided with a first support part for supporting a tire, a second support part for supporting the tire, and an air supply and removal part for supplying and removing air from the inside of the tire. The second support part has a protrusion that protrudes toward the first support part. The air supply and removal part has a first flow path for allowing air to flow, a second flow path for allowing air to flow from an opening formed at the leading end of the protrusion to the inside of the tire, and a collection part that (Continued)

is attached to the opening and collects foreign matter that has been mixed into the second flow path from the inside of the tire.

8 Claims, 4 Drawing Sheets

(51) Int. Cl.
  *B60C 19/00* (2006.01)
  *G01M 1/02* (2006.01)

(56) References Cited

U.S. PATENT DOCUMENTS

| | | | | |
|---|---|---|---|---|
| 5,168,911 | A * | 12/1992 | Gottschalk | B60C 25/145 |
| | | | | 141/95 |
| 8,511,157 | B2 * | 8/2013 | Murakami | G01M 17/021 |
| | | | | 152/415 |
| 9,056,435 | B2 * | 6/2015 | Hinque | B29D 30/0061 |
| 2005/0188755 | A1 | 9/2005 | Cargould et al. | |
| 2011/0113875 | A1 | 5/2011 | Okada et al. | |
| 2011/0203362 | A1 * | 8/2011 | Imamura | G01M 17/021 |
| | | | | 73/146 |
| 2014/0069180 | A1 | 3/2014 | Ueda et al. | |

FOREIGN PATENT DOCUMENTS

| | | | |
|---|---|---|---|
| JP | 6-23865 | A | 2/1994 |
| JP | 2630727 | B2 | 7/1997 |
| JP | 11-223570 | A | 8/1999 |
| JP | 3418512 | B2 | 6/2003 |
| JP | 3904319 | B2 | 4/2007 |
| JP | 4011632 | B2 | 11/2007 |
| JP | 2011-157879 | A | 8/2011 |
| JP | 2011-169768 | A | 9/2011 |
| KR | 10-2013-0129288 | A | 11/2013 |
| TW | 201335583 | A1 | 9/2013 |
| WO | 2013/105418 | A1 | 7/2013 |

OTHER PUBLICATIONS

Written Opinion of the ISA in International Application No. PCT/JP2014/082152, dated Mar. 10, 2015.
Decision to Grant in TW Application No. 103143315 dated Mar. 18, 2016 with translation of Search Report.

* cited by examiner

TIRE HOLDING APPARATUS AND TIRE INSPECTION SYSTEM PROVIDED WITH SAID TIRE HOLDING APPARATUS

RELATED APPLICATIONS

The present application is a National Phase of International Application Number PCT/JP2014/082152, filed Dec. 4, 2014, and claims priority of Japanese Patent Application No. 2014-088197 filed on Apr. 22, 2014.

TECHNICAL FIELD

The present invention relates to a tire holding apparatus and a tire inspection system provided with the tire holding apparatus.

Priority is claimed on Japanese Patent Application No. 2014-088197, filed Apr. 22, 2014, the content of which is incorporated herein by reference.

BACKGROUND ART

In a manufacturing process of a tire, various tests are performed on a vulcanized tire for quality inspection. As a system for testing a tire, there is a tire uniformity machine for measuring uniformity of a tire, or a tire balance measurement apparatus for measuring the balance of a tire. In the system for testing a tire, a tire holding apparatus which holds a tire which is a test object is used.

For example, a tire holding apparatus is disclosed in PTL 1 to PTL 3. In the tire holding apparatuses disclosed in PTL 1 to PTL 3, a lower rim and an upper rim which are attachable to and detachable from each other are used so as to hold a tire with a desired width dimension. In the tire holding apparatus, inflation processing is performed in which a tire is held so as to be interposed between the lower rim and the upper rim and air is fed into the inside of the tire. Accordingly, in the tire holding apparatus, a pressure inside the tire increases to a value close to that in a use state so as to simulate a use state in which a wheel is actually mounted.

CITATION LIST

Patent Literature

[PTL 1] Japanese Unexamined Patent Application Publication No. 2011-169768
[PTL 2] Japanese Patent No. 2630727
[PTL 3] Japanese Patent No. 3904319

SUMMARY OF INVENTION

Technical Problem

However, spews such as beards generated when rubber flows into a mold to manufacture a tire, or burrs which are generated on end portions when rubber flows between molds are attached to the tire. The spews or burrs are trimmed from a tire main body before various inspections are performed. However, small scraps which are trimmed and drop from the tire main body may remain inside the tire as foreign matter. If air inside the tire is discharged so as to remove the tire from the tire holding apparatus after the inspections end, the foreign matter remaining inside the tire is discharged from the inside of the tire along the air and enters flow paths for discharging air such as pipes in the tire holding apparatus. Accordingly, the foreign matter reaches the pipes or valves in the tire holding apparatus, problems such as clogging of pipes or failures of valves occur, and there is a concern that air may not be sufficiently supplied to and discharged from the tire.

The present invention provides a tire holding apparatus capable of stably supplying air to and discharging air from a held tire and a tire inspection system provided with the tire holding apparatus.

Solution to Problem

According to a first aspect of the present invention, there is provided a tire holding apparatus, including: a first support portion to which a first rim supporting one side of a tire is attached; a second support portion to which a second rim supporting the other side of the tire is attached; and an air supply and discharging portion which is connected to a supply source for supplying air, supplies air to the inside of the tire supported by the first rim and the second rim, and discharges the air supplied to the inside of the tire outside of the tire, in which the second support portion includes a protrusion which protrudes toward the first support portion, the first support portion includes an insertion portion into which the protrusion is inserted, and the air supply and discharging portion includes a first flow path which is formed so as to penetrate the insertion portion and allows the air to flow, a second flow path which allows the air flowing through the first flow path to flow from an opening portion formed on a leading end of the protrusion to the inside of the tire, and a collection portion which is provided in the opening portion and collects foreign matter which is mixed into the second flow path from the inside of the tire.

According to this configuration, the collection portion is provided in the opening portion which is the inflow port of air between the first flow path and the second flow path. Accordingly, when air is discharged from the inside of the tire, it is possible to prevent the foreign matter inside the tire from being mixed into the second flow path and from flowing into the first flow path. That is, in a case where foreign matter remains inside the tire due to processing of spews or burrs, even when the foreign matter is discharged from the inside of the tire along with exhausted air, by collecting the foreign matter using the collection portion, it is possible to prevent the foreign matter from being mixed into the first flow path. Accordingly, it is possible to prevent the first flow path from being clogged by the foreign matter, and flow of air from being interfered with.

According to the tire holding apparatus of a second aspect of the present invention, in the first aspect, the collection portion may be provided to be attachable to and detachable from the opening portion.

According to this configuration, it is possible to easily remove the collection portion. Specifically, the collection portion is provided in the opening portion which is the leading end of the protrusion. Accordingly, in a state where the second rim is separated from the first rim and the protrusion is not inserted into the insertion portion, the opening portion of the protrusion is exposed. Therefore, it is possible to easily access the collection portion which is provided in the opening portion. Since the collection portion is attachable and detachable, in a case where foreign matter has accumulated on the collection portion, it is possible to easily remove, replace, and clean the collection portion, and it is possible to improve maintenance.

According to the tire holding apparatus of a third aspect of the present invention, in the second aspect, the collection portion may include a ring member which is attachable to and detachable from the opening portion, and a filter which is attached to the opening portion by the ring member.

According to this configuration, since the filter is formed separately from the ring member which is attachable to and detachable from the opening portion, it is possible to replace the filter in accordance with an object. Accordingly, since the filter is used according to the foreign matter which is an object to be collected, it is possible to more effectively collect the foreign matter. Therefore, it is possible to easily adjust the foreign matter which is required to be removed according to the used tire holding apparatus.

According to the tire holding apparatus of a fourth aspect of the present invention, in the third aspect, the protrusion may protrude in a tubular shape from the second support portion, the ring member may be formed in a tubular shape and inserted into the opening portion, and the collection portion may include an elastic member which is attached in a state of being compressed and deformed between an outer peripheral surface of the ring member and an inner peripheral surface of the protrusion.

According to this configuration, it is possible to restrict the movement of the ring member by the elastic member. Specifically, if the ring member is inserted from the opening portion, the compressed and deformed elastic member repels the outer peripheral surface of the ring member and the inner peripheral surface of the protrusion. Accordingly, the movement of the ring member is restricted. Therefore, it is possible to easily attach the ring member to the protrusion by simply inserting the ring member into the opening portion.

According to the tire holding apparatus of a fifth aspect of the present invention, in the third aspect, the protrusion may protrude in a tubular shape from the second support portion, the ring member may be formed in a tubular shape and inserted into the opening portion, and the collection portion may include engagement portions, which can engage an inner peripheral surface of the protrusion and an outer peripheral surface of the ring member and can release the engagement state by the inner peripheral surface and the outer peripheral surface being rotated relative to each other, on the inner peripheral surface and the outer peripheral surface.

According to this configuration, since the inner peripheral surface of the protrusion and the outer peripheral surface of the ring member engage with each other and the engagement state is released by the relative rotation, it is possible to easily attach the ring member to the protrusion. If the inner peripheral surface of the protrusion and the outer peripheral surface of the ring member are not rotated relative to each other, the engagement state is not released. Accordingly, it is possible to more firmly attach the collection portion to the opening portion.

According to the tire holding apparatus of a sixth aspect of the present invention, in the third aspect, the protrusion may protrude in a tubular shape from the second support portion, the ring member may be formed in a tubular shape and inserted into the opening portion, and the collection portion may include a restriction portion which restricts movement of the ring member with respect to the opening portion from the outside of the protrusion.

According to this configuration, the movement of the ring member is restricted from the outside by the restriction portion in a state where the ring member is inserted from the opening portion. Accordingly, only when the restriction portion is released from the outside, is it possible to move the ring member. Therefore, it is possible to more firmly attach the collection portion to the opening portion.

According to the tire holding apparatus of a seventh aspect of the present invention, in any one of the third to sixth aspects, an inclined surface, which faces the second flow path and is inclined in a flow direction of the air flowing through the second flow path, may be formed on the collection portion.

According to this configuration, since the inclined surface which is inclined so as to face the second flow path is formed on the collection portion, foreign matter flowing through the second flow path in the flow direction of the air along with the air collides with the inclined surface and is accumulated so as to be biased toward one side. Accordingly, a state where small amounts of foreign matter exist on the other side can be maintained. Accordingly, the space for allowing air to flow is easily secured, and it is possible to more stably allow air to flow.

According an eighth aspect of the present invention, there is provided a tire inspection system, including: the tire holding apparatus; and a measurement device which measures characteristics of a tire supported by the first rim and the second rim.

According to this configuration, since the tire holding apparatus is used, processes, in which mounting, air supply, measurement, air discharging, and removal are sequentially performed on a tire which is a measurement object, can be continuously and stably performed on a plurality of tires.

Advantageous Effects of Invention

According to the present invention, it is possible to collect foreign matter by a collection portion, and it is possible to stably supply air to and discharge air from a held tire.

DESCRIPTION OF EMBODIMENTS

First Embodiment

Figure 2:
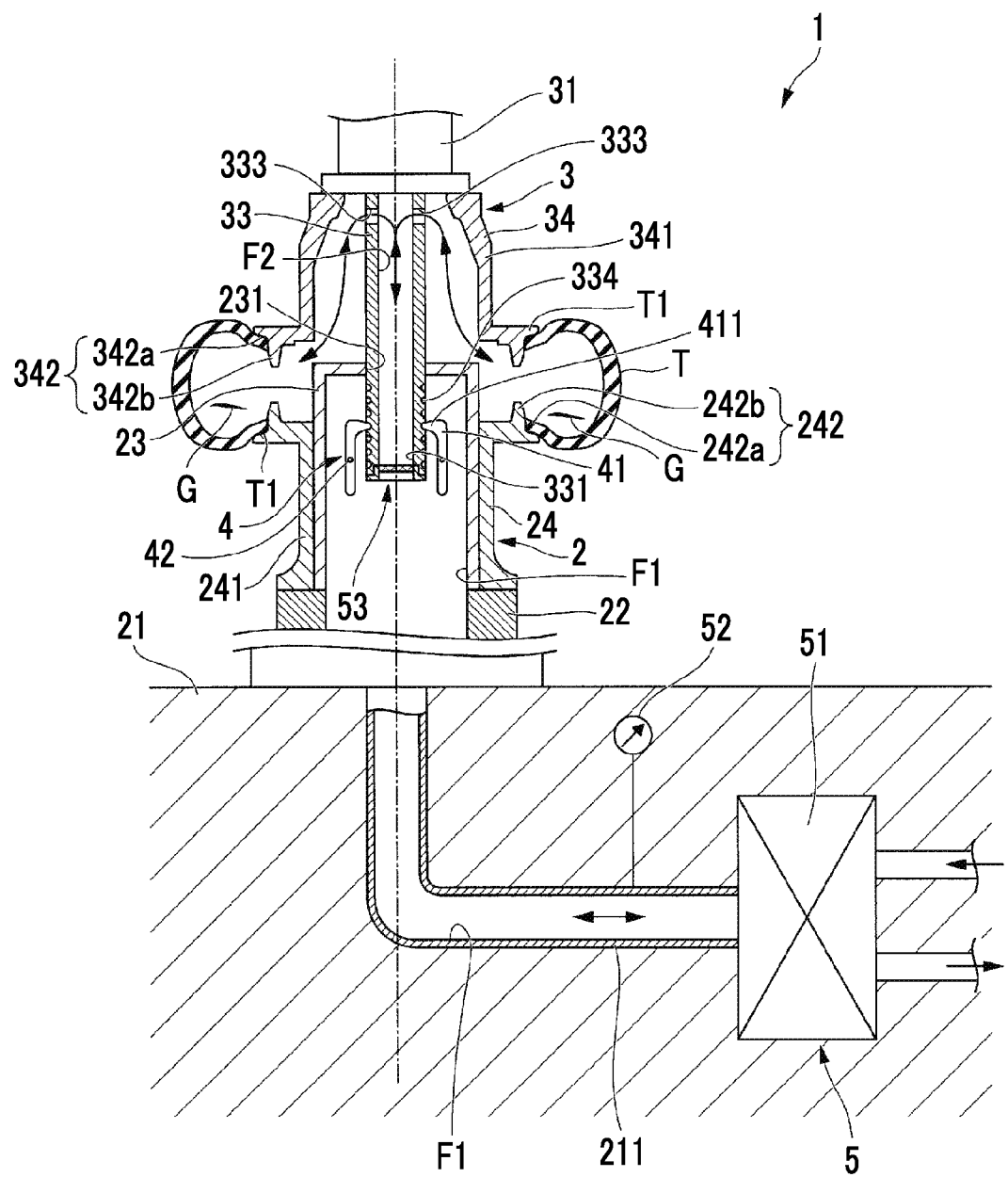
FIG. 2 is a schematic view explaining a structure inside a tire holding apparatus in each embodiment of the present invention.
Figure 3:
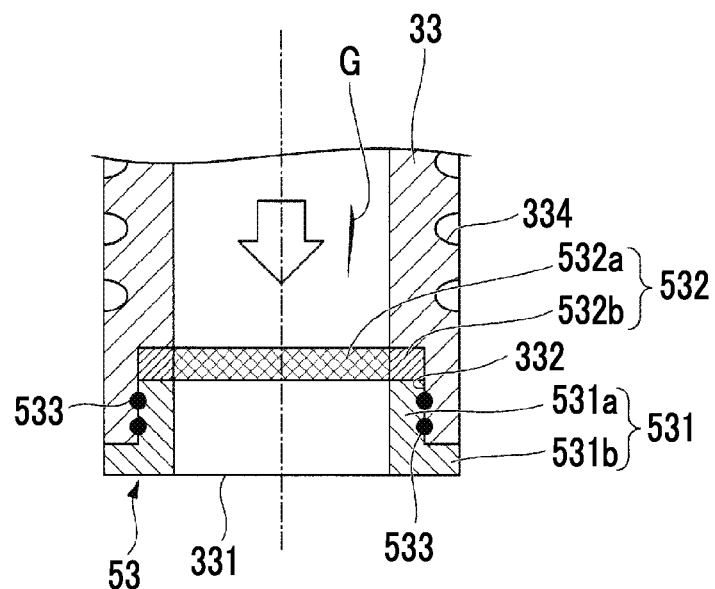
FIG. 3 is a sectional view explaining a collection portion in a first embodiment of the present invention.

Hereinafter, a first embodiment of the present invention will be described with reference to FIGS. 1 to 3.

A tire inspection system 100 according to an embodiment of the present invention will be described. In the following embodiments, a case where the tire inspection system 100 is a tire uniformity machine is described.

The tire inspection system 100 measures and inspects characteristics of a vulcanized and formed tire T such as nonuniformity of the tire T. As shown in FIG. 1, the tire inspection system 100 of the present embodiment includes a tire holding apparatus 1 for holding the tire T which is a test object, and a load wheel 11 for applying a predetermined load to the tire T.

The tire holding apparatus 1 holds the tire T which is a test object and feeds air to the inside of the tire T, and a use state of the tire T on which a wheel is actually mounted is simulated. FIG. 2 is a schematic view explaining a structure inside the tire holding apparatus 1 of the present embodiment. As shown in FIG. 2, the tire holding apparatus 1 of the present embodiment includes a first support portion (lower spindle) 2 to which a first rim (lower rim) 24 is attached, a lower rim 24 which supports one side of the tire T, a second support portion (upper spindle) 3 to which a second rim (upper rim) 34 is attached, a upper rim 34 which supports the other side of the tire T, a connection portion 4 which connects the upper spindle 3 to the lower spindle 2, and an air supply and discharging portion 5 which supplies air to and discharge air from the inside of the tire T which is held by the lower rim 24 and the upper rim 34.

The lower spindle 2 rotatably holds the tire T via the lower rim 24. Specifically, the lower spindle 2 of the present embodiment includes a base 21, a lower spindle main portion 22 which is installed on the base 21, and an insertion portion 23 which protrudes from the lower spindle main portion 22 toward the upper spindle 3.

The lower spindle main portion 22 is connected to a motor (not shown) and is rotatably installed to the base 21. The lower rim 24 is attachable to and detachable from the lower spindle main portion 22. The lower spindle main portion 22 of the present embodiment has a tubular shape extending in a vertical direction. Specifically, in the lower spindle main portion 22 of the present embodiment, a hollow portion having a circular section in the inside configures a portion of a first flow path F1.

The insertion portion 23 protrudes upward in the vertical direction from the lower spindle main portion 22 toward the upper spindle 3. The insertion portion 23 of the present embodiment has a bottomed tubular shape extending in the vertical direction. The insertion portion 23 is formed on the upper end of the lower spindle main portion 22 in the vertical direction such that the central axis of the insertion portion is positioned on an extension line of the central axis of the lower spindle main portion 22. The top of the insertion portion 23 has an insertion hole 231 which is disposed upward in the vertical direction and is circularly formed in the center. Specifically, in the inside of the insertion portion 23 of the present embodiment, a hollow portion configures a portion of the first flow path F1, and the hollow portion has an outer diameter in which the lower rim 24 can be mounted, extends in the vertical direction, and has a circular inner section.

The lower rim 24 supports a lower bead portion T1 of the tire T from the lower side in the vertical direction which is one side in an axial direction of the tire T. The lower rim 24 of the present embodiment includes a lower rim fitting portion 241 which is formed in a tubular shape, and a lower rim main portion 242 which is provided on the end portion of the lower rim fitting portion 241.

The lower rim fitting portion 241 is inserted into the insertion portion 23 and is attached to the lower spindle main portion 22. The lower rim fitting portion 241 has a tubular shape which extends in the vertical direction. In the lower rim fitting portion 241, the hollow portion of the inside is formed in a shape into which the insertion portion 23 can be inserted. The central axis of the lower rim fitting portion 241 of the present embodiment is disposed on the central axis of the insertion portion 23.

The lower rim main portion 242 is formed on an upper end portion of the lower rim fitting portion 241 in the vertical direction. The lower rim main portion 242 is formed in a circle in a plan view, which includes a lower rim pressing surface 242a which can come into close contact with the entire periphery of the outer surface of the lower bead portion T1 of the tire T and is a ring-shaped horizontal surface. In the lower rim main portion 242, a lower rim cylindrical portion 242b which is fitted to the inner peripheral side of the bead portion T1 is formed so as to protrude upward in the vertical direction from the lower rim pressing surface 242a.

The upper spindle 3 rotatably holds the tire T via the upper rim 34. Specifically, the upper spindle 3 of the present embodiment includes a upper support portion main body 31 which is disposed so as to face the lower spindle main portion 22, a lifting and lowering mechanism 32 which moves the upper support portion main body 31 up and down in the vertical direction, and a protrusion 33 which protrudes from the upper support portion main body 31 toward the lower spindle 2.

The upper support portion main body 31 is disposed so as to face the lower spindle main portion 22 in the vertical direction. The upper support portion main body 31 is supported so as to be rotatable with respect to the lifting and lowering mechanism 32. The upper rim 34 is attachable to and detachable from the upper support portion main body 31.

Figure 1:
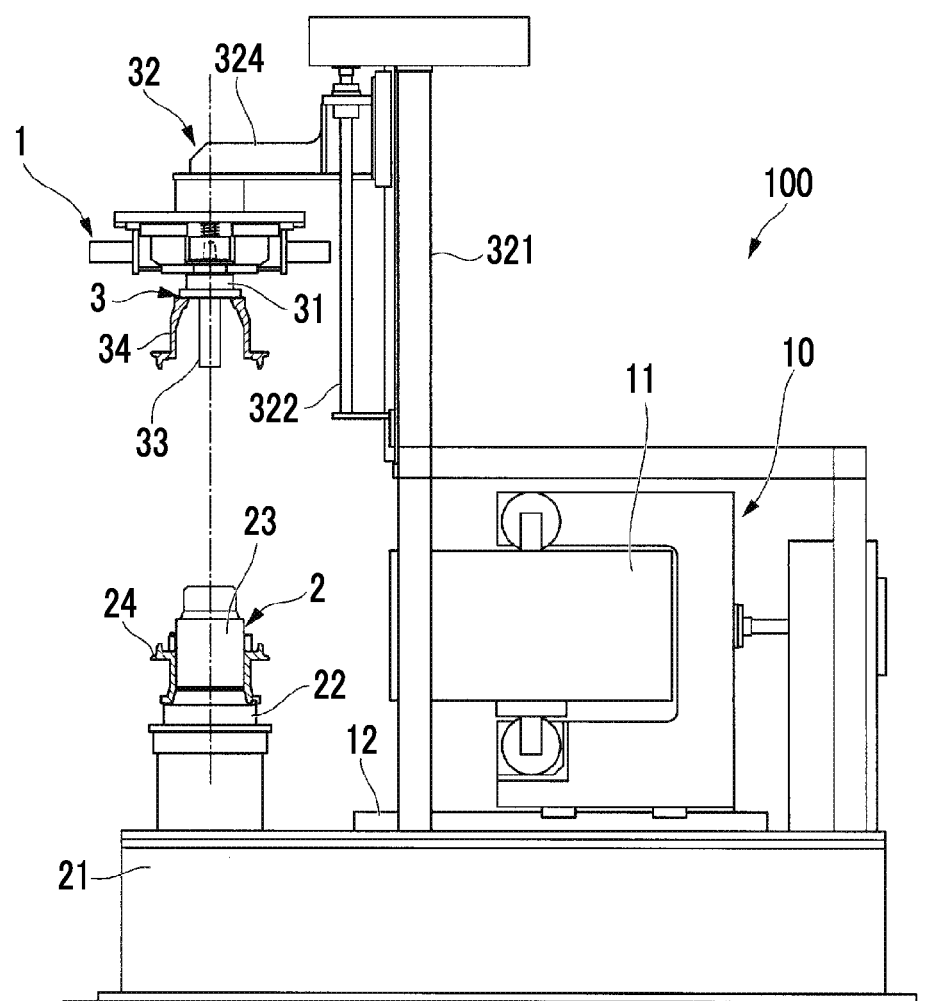
FIG. 1 is a schematic configuration view explaining a tire inspection system in each embodiment of the present invention.

As shown in FIG. 1, in the lifting and lowering mechanism 32, a rim elevator 324 is attached to a frame 321, which is fixed to the base 21, via a ball screw 322. The rim elevator 324 can move up and down in the vertical direction by the ball screw 322. The upper support portion main body 31 is fixed to the rim elevator 324. The lifting and lowering mechanism 32 adjusts a position of the upper support portion main body 31 in the vertical direction via the rim elevator 324, and adjusts a distance of the upper support portion main body 31 with respect to the lower spindle main portion 22 in the vertical direction.

The protrusion 33 protrudes downward in the vertical direction from the upper support portion main body 31 toward the lower spindle 2. The protrusion 33 of the present embodiment has a tubular shape which extends in the vertical direction. The central axis of the protrusion 33 is formed so as to be positioned on the extension line of the central axis of the insertion portion 23. The protrusion 33 of the present embodiment extends in the vertical direction so as to have an outer diameter which can be inserted into the insertion hole 231 formed on the top of the insertion portion 23.

Specifically, the protrusion 33 of the present embodiment has an outer diameter such that the outer peripheral surface of the protrusion 33 is inserted into the insertion hole 231 while coming into contact with the inner peripheral surface of the insertion hole 231. In the protrusion 33 of the present embodiment, the upper end in the vertical direction is integrally connected to the upper support portion main body 31. Since the lower end of the protrusion 33 in the vertical direction is open, the leading end of the protrusion 33 has an opening portion 331.

In the opening portion 331, an attached recess portion 332 for attaching a collection portion 53 described below is formed.

The attached recess portion 332 is formed so as to be recessed from the inner peripheral surface of the protrusion 33 toward the outer peripheral surface side in the opening portion 331 and so as to be open from the leading end of the protrusion 33. Specifically, the attached recess portion 332 of the present embodiment has a circular section which is slightly larger than that of the inner peripheral surface of the protrusion 33, and is recessed from the leading end of the protrusion 33.

In the protrusion 33, flow holes 333 penetrating in the horizontal direction are formed on the upper support portion main body 31 side which is the upper side in the vertical direction.

In the present embodiment, the flow holes 333 are formed so as to penetrate in the horizontal direction from the inner peripheral surface of the protrusion 33 toward the outer peripheral surface. The flow holes 333 are formed at two locations facing each other in a state where the central axis of the protrusion 33 is interposed therebetween.

Accordingly, since the inside of the protrusion 33 communicates with the flow holes 333 via the hollow portion having an inner circular section from the opening portion 331, the inside of the protrusion 33 configures a second flow path F2 which allows air to flow to the inside of the tire T.

In the protrusion 33, engagement grooves 334 which are recessed from the outer peripheral surface of the lower end portion in the vertical direction are formed.

The engagement grooves 334 are annularly formed over the entire periphery of the outer peripheral surface of the protrusion 33. The plurality of engagement grooves 334 are formed so as to be separated from each other in the vertical direction. The engagement grooves 334 engage with the connection portion 4.

The upper rim 34 supports the upper bead portion T1 of the tire T from the upper side in the vertical direction which is the other side in the axial direction of the tire T. The upper rim 34 can be replaced according to a bead diameter of the tire T along with the lower rim 24. Specifically, the upper rim 34 of the present embodiment includes a upper rim attachment portion 341 which is formed in a tubular shape, and a upper rim main body 342 which is provided on the end portion of the upper rim attachment portion 341.

The upper rim attachment portion 341 is attached to the upper support portion main body 31 so as to face the lower rim 24 in the vertical direction. The upper rim attachment portion 341 has a tubular shape which extends in the vertical direction. The upper rim attachment portion 341 is formed so as to have a shape in which the protrusion 33 can be disposed in the hollow portion inside the upper rim attachment portion 341. The upper rim attachment portion 341 is disposed such that the central axis is coaxial with the central axis of the protrusion 33. The upper rim attachment portion 341 is mounted on the upper support portion main body 31.

The upper rim main body 342 is formed on the lower end portion of the upper rim attachment portion 341 in the vertical direction. The upper rim main body 342 is formed in a circle in a plan view, which includes a upper rim pressing surface 342*a* which can come into close contact with the entire periphery of the outer surface of the upper bead portion T1 of the tire T and is a ring-shaped horizontal surface. In the upper rim main body 342, a upper rim cylindrical portion 342*b* which is fitted to the inner peripheral side of the bead portion T1 is formed so as to protrude downward in the vertical direction from the upper rim pressing surface 342*a*.

The connection portion 4 fixes the position of the upper rim 34 at desired position with respect to the lower rim 24, and releases the fixed state. The connection portion 4 of the present embodiment includes engagement pieces 41 which engage with the engagement grooves 334, pins 42 which rotatably support the engagement pieces 41, and a driving mechanism (not shown) which rotates the engagement pieces 41 about the pins 42.

The engagement pieces 41 are disposed at four locations of the insertion portion 23 with equal intervals of 90°. In each of the engagement pieces 41, a hook portion 411 protrudes toward the central axis side of the insertion portion 23 on the upper side in the vertical direction.

The pin 42 is disposed at the center of the engagement piece 41 in the vertical direction. The pin 42 rotatably supports the engagement piece 41.

The driving mechanism biases the lower end of the engagement piece 41 toward the central axis of the insertion portion 23 by an elastic body (not shown) such as a spring, and rotates the engagement piece 41 about the pin 42. The protrusion 33 is inserted into a portion between the engagement pieces 41 by the driving mechanism, and the lower ends of the engagement pieces 41 are pressed to the outer peripheral side of the protrusion 33. Accordingly, the driving mechanism rotates the engagement pieces 41, and can insert the hook portions 411 into the engagement groove 334 of the protrusion 33 or can separate the hook portions 411 from the engagement groove 334.

The air supply and discharging portion 5 is connected to a supply source (not shown) which supplies air. The air supply and discharging portion 5 supplies air to the inside of the tire T supported by the lower rim and the upper rim 34, and discharges air, which is supplied to the inside of the tire T, outside of the tire T. The air supply and discharging portion 5 of the present embodiment includes the first flow path F1, the second flow path F2, a valve portion 51 which adjusts inflow and outflow of air with respect to the first flow path F1, a pressure gauge 52 which is disposed in the first flow path F1, and a collection portion 53 which is attached to the opening portion 331 of the protrusion 33.

The first flow path F1 which allows air supplied from the supply source via the valve portion 51 to flow to the second flow path F2, and allows air flowing in from the second flow path F2 to flow to the valve portion 51. As described above, the first flow path F1 of the present embodiment is formed in the lower spindle main portion 22 and the insertion portion 23, and is also formed in the base 21. In the base 21, the first flow path F1 is connected to the portion of the first flow path F1 formed in the lower spindle main portion 22. The first flow path F1 is configured of a pipe 211 having a circular section.

The second flow path F2 allows the air flowing in from the first flow path F1 to flow from the opening portion 331 of the leading end of the protrusion 33 to the inside of the tire T via the flow holes 333, and allows the air inside the tire T to flow from the flow holes 333 to the first flow path F1 via the opening portion 331.

The supply of air to the first flow path F1 and the discharging of air from the first flow path F1 are switched by the valve portion 51. Specifically, the valve portion 51 of the present embodiment is provided in the base 21, and is connected to one end portion of the first flow path F1. The valve portion 51 of the present embodiment is connected to the air supply source (not shown) and an air discharging port (not shown). The valve portion 51 opens an air flow path of any one of the supply source and the discharging port and closes an air flow path of the other.

The pressure gauge 52 measures a pressure of air inside the first flow path F1. The pressure gauge 52 of the present embodiment is disposed at a position close to the valve portion 51 in the first flow path F1.

The collection portion 53 collects foreign matter G which is mixed into the second flow path F2 from the inside of the tire T. The collection portion 53 is provided in the opening portion 331 of the protrusion 33. The collection portion 53 collects the foreign matter G entering from the inside of the tire T into the second flow path F2 via the flow holes 333. The collection portion 53 of the present embodiment is provided so as to be attachable to and detachable from the protrusion 33 in the opening portion 331. Specifically, as shown in FIG. 3, the collection portion 53 of the present embodiment includes a ring member 531 which is attachable to and detachable from the opening portion 331, a filter 532 which is attached to the opening portion 331 by the ring member 531, and an elastic member 533 which is disposed between the ring member 531 and the protrusion 33.

The ring member 531 is inserted into the protrusion 33 from the opening portion 331, and is attached to the protrusion 33. The ring member 531 of the present embodiment includes a ring member main body 531a having a tubular shape, and a flanged portion 531b which protrudes from one end of the ring member main body 531a to the outer peripheral side.

The ring member main body 531a is inserted into the attached recess portion 332 formed in the opening portion 331. The ring member main body 531a of the present embodiment is formed in a tubular shape extending in the vertical direction. Specifically, the ring member main body 531a of the present embodiment is formed in a tubular shape such that, in a state where the ring member main body 531a is inserted into the attached recess portion 332, the outer peripheral surface of the ring member main body 531a comes into contact with the inner peripheral surface of the attached recess portion 332, and the inner peripheral surface of the ring member main body 531a flushes with the inner peripheral surface of the protrusion 33 without a step with respect to the inner peripheral surface of the protrusion 33.

The flanged portion 531b is formed on the lower end surface of the ring member main body 531a in the vertical direction. The flanged portion 531b is formed so as to protrude outward from the ring member main body 531a in the radial direction. The flanged portion 531b of the present embodiment is formed such that, in a state where the flanged portion 531b is inserted into the attached recess portion 332, the outer peripheral surface of the flanged portion 531b flushes with the outer peripheral surface of the protrusion 33 without a step with respect to the outer peripheral surface of the protrusion 33.

Air flows through the filter 532 in the opening portion 331, and the filter 532 prohibits flow of materials having a predetermined size. The filter 532 of the present embodiment is held by the ring member 531 in a state of being fitted to the opening portion 331. The filter 532 of the present embodiment includes a filter main body 532a, and an edge portion 532b which covers the outer peripheral side of the filter main body 532a.

The filter main body 532a is formed is a disk shape. The filter main body 532a is formed in a net shape having a predetermined degree of roughness capable of collecting the foreign matter G remaining inside the tire. The filter main body 532a includes a filter surface in which openings are formed on the surface. In the filter main body 532a of the present embodiment, in order to allow the most amount of air to flow in the vertical direction which is the flow direction of the air flowing through the second flow path F2, the meshes of the filter main body 532a are formed so as to open in the vertical direction. In the filter main body 532a of the present embodiment, the filter surfaces are disposed so as to face up and down in the vertical direction.

The edge portion 532b is fixed to the filter main body 532a. The edge portion 532b is formed in an annular shape which covers the outer periphery of the filer main body 532a.

The elastic member 533 is attached in a state of being compressed and deformed between the outer peripheral surface of the ring member 531 and the inner peripheral surface of the protrusion 33. The elastic member 533 of the present embodiment is fixed to the outer peripheral surface of the ring member main body 531a. For example, as the elastic member 533 of the present embodiment, an O ring which is formed of a rubber material is used. In the present embodiment, two O rings are disposed on the outer peripheral surface of the ring member main body 531a so as to be separated from each other in the vertical direction.

The measurement section 10 is a measurement device which measures characteristics of the tier T supported by the lower rim 24 and the upper rim 34. For example, as the characteristics of the tire T measured by the measurement section 10, characteristics of the tire T such as radial force variation (RFV) indicating variation of a force in a radial direction, lateral force variation (LFV) indicating variation of a force in an axial direction, or tangential force variation (TFV) indicating variation of a force in a traveling direction are measured. In the present embodiment, as the characteristics of the tire T, distribution of a load is measured and unevenness of the load is measured.

As shown in FIG. 1, as the measurement section 10 of the present embodiment, a load wheel 11 which is disposed on a rail 12 in the base 21 is provided. The load wheel 11 is rotatable. Only when the measurement is performed, the load wheel 11 travels on the rail 12, approaches the lower spindle 2, and applies a predetermined load to the tire T.

Next, an operation of the tire inspection system 100 of the first embodiment will be described.

According to the tire inspection system 100 of the first embodiment, in the tire holding apparatus 1, the collection portion 53 is attached to the protrusion 33 from the opening portion 331. Specifically, the filter 532 is inserted from the opening portion 331 such that the outer peripheral surface of the edge portion 532b comes into contact with the inner peripheral surface of the attached recess portion 332, and the ring member 531 is inserted. In the ring member 531, the elastic member 533, which is fixed to the outer peripheral surface of the ring member main body 531a, is press-fitted into the inner peripheral surface of the attached recess portion 332 so as to be pressed. The ring member 531 is inserted to a position at which a gap between the flanged portion 531b and the leading end of the protrusion 33 is not generated. As a result, a movement of the ring member 531 in the opening portion 331 is restricted in a state where the filter 532 is interposed between the protrusion 33 and the ring member 531, and the collection portion 53 is attached to the opening portion 331.

After the collection portion 53 is attached to the opening portion 331 of the protrusion 33, the tire T is attached to the tire holding apparatus 1. Specifically, the tire T is disposed on the lower rim main portion 242 of the lower rim 24 so as to be arranged with the center of the insertion portion 23. In this case, the lower rim cylindrical portion 242b of the lower rim 24 is fitted into the inner side of the lower bead portion T1 of the tire T. The rim elevator 324 of the lifting and lowering mechanism 32 is lowered in accordance with a width of the tire T, and the upper rim 34 is lowered toward the tire T. According to the lowering of the upper rim 34, the protrusion 33 is inserted into the insertion hole 231 of the insertion portion 23. In this case, the upper rim cylindrical portion 342b of the upper rim 34 is fitted into the inner side of the upper bead portion T1 of the tire T. Thereafter, the engagement pieces 41 are rotated by the driving mechanism (not shown), and the hook portions 411 of the engagement pieces 41 engage with the engagement groove 334. Accordingly, the position of the protrusion 33 is fixed at a desired position in accordance with the width of the tire T. Therefore, the tire T is supported by the lower rim 24 and the upper rim 34 in a state where the bead portion T1 is interposed therebetween from the upper side and the lower side in the vertical direction.

In this state, the flow path of the air supply source side is opened by the valve portion 51, and air flows into the first flow path F1 from the supply source. The air flowing from the valve portion 51 into the first flow path F1 flows into the second flow path F2 through the collection portion 53 which is provided in the opening portion 331 of the protrusion 33. The air flowing into the second flow path F2 flows from the flow holes 333 into a space interposed between the lower rim 24 and the upper rim 34, and flows into the inside of the tire T which is supported by the lower rim 24 and the upper rim 34. The air flows into the inside of the tire T, a pressure inside the tire T increases, and the tire T is expanded. As a result, the tire T is pressed to the lower rim pressing surface 242a of the lower rim 24 and the upper rim pressing surface 342a of the upper rim 34 without a gap therebetween. Thereafter, air further flows into the tire T, and the pressure inside the tire T increases to a predetermined pressure so as to simulate a use state of the tire T.

In a state where the use state of the tire T is simulated, the characteristics of the tire T is measured by the measurement section 10. Specifically, the lower spindle main portion 22 is rotated by a motor (not shown), and the tire T rotates around the central axis of the lower spindle main portion 22. The load wheel 11 approaches the lower spindle 2 so as to come into contact with the tire T, and distribution of the load applied to the tire T is measured.

If the measurement with respect to the distribution of the load applied to the tire T ends, the load wheel 11 is separated from the lower spindle 2, the rotation of the motor (not shown) of the lower spindle main portion 22 stops, and the rotation of the tire T stops. The flow path of the air supply source side is closed by the valve portion 51, the flow path of the discharging port side is opened by the valve portion 51, and the air inside the tire T is discharged. Specifically, the flow path of the discharging port side is opened by the valve portion 51, and the air inside the tire T flows into the second flow path F2 via the flow holes 333. The air flowing into the second flow path F2 flows into the first flow path F1 through the collection portion 53 of the opening portion 331. The air flowing into the first flow path F1 is discharged from the discharging port via the valve portion 51. Here, even when the foreign matter G is mixed to the inside of the tire T and are discharged from the inside of the tire T along with the air, the air flows from the second flow path F2 into the first flow path F1 through the collection portion 53. Meanwhile, the foreign matter G is collected by the collection portion 53 and do not flow into the first flow path F1.

If the air inside the tire T is discharged, the engagement pieces 41 are released from the engagement groove 334 of the protrusion 33 by the driving mechanism (not shown). Thereafter, the upper spindle 3 is lifted by the rim elevator 324, and the upper rim cylindrical portion 342b is removed from the upper bead portion T1 of the tire T. The lower rim cylindrical portion 242b is removed from the lower bead portion T1, and the tire T is extracted.

According to the above-described tire holding apparatus 1, the collection portion 53 is provided in the opening portion 331 which is the inflow port of air between the first flow path F1 and the second flow path F2. Accordingly, when air is discharged from the inside of the tire T, it is possible to prevent the foreign matter G inside the tire T from being mixed into the second flow path F2 and from flowing into the first flow path F1. That is, in a case where small foreign matter G such as debris of rubber generated inside the tire T due to processing of spews or burrs remains, the foreign matter G flows from the inside of the tire T into the tire holding apparatus 1 along the air discharged from the inside of the tire T. Even in this case, since the foreign matter G is collected by the collection portion 53, it is possible to prevent the foreign matter G from being mixed into the lower spindle main portion 22 or the pipe 211 in the base configuring the first flow path F1 inside the tire holding apparatus 1, or the valve portion 51 connected to the first flow path F1. Accordingly, it is possible to prevent the first flow path F1 or the valve portion 51 from being clogged by the foreign matter G, and flow of air from being interfered. Therefore, it is possible to prevent disadvantages such as a case where time during when air is supplied until the pressure inside the tire T becomes a predetermined pressure is lengthened and a service time is shortened, or a case where the pressure inside the tire T cannot increase to a predetermined pressure. Accordingly, it is possible to stably supply air to and discharge air from the held tire T.

Since the collection portion 53 is attachable to and detachable from the opening portion 331 which is the leading end of the protrusion 33, it is possible to easily remove the collection portion 53. Specifically, the collection portion 53 is provided in the opening portion 331 which is the leading end of the protrusion 33. Accordingly, before the tire T is held, in a state where the upper rim 34 is separated from the lower rim 24 and the protrusion 33 is not inserted into the insertion portion 23, the opening portion 331 of the protrusion 33 is exposed. Accordingly, it is possible to easily access the collection portion 53 which is provided in the opening portion 331. Since the collection portion 53 is attachable and detachable, in a case where the foreign matter G is accumulated on the collection portion 53, it is possible to easily remove, replace, and clean the collection portion 53, and it is possible to improve maintenance. Accordingly, even in a case where air is supplied to and discharged from the insides of the plurality of tires T and many foreign matters G are collected by the collection portion 53, it is possible to stably supply air to and discharge air from the held tire T.

Since the collection portion 53 has the structure in which the filter 532 is attached by the ring member 531, the collection portion 53 is more easily attachable to and detachable from the opening portion 331. In the collection portion 53, since the filter 532 is formed separately from the ring member 531 which is attachable to and detachable from the opening portion 331, it is possible to replace the filter 532 in accordance with an object. Accordingly, since the filter 532 is used according to the foreign matter G which is an object to be collected, it is possible to more effectively collect the foreign matter G. Specifically, for example, by changing the degree of roughness of the filter 532, it is possible to easily change the size of the foreign matter G which is the object to be collected. Accordingly, it is possible to easily adjust the foreign matter G which is required to be removed according to the used tire holding apparatus 1.

Since the elastic member 533, which is attached to the outer peripheral surface of the ring member main body 531a so as to be compressed and deformed between the outer peripheral surface of the ring member main body 531a and the inner peripheral surface of the attached recess portion 332, is provided in the state where the protrusion 33 is formed in a tubular shape and the ring member 531 is also formed in a tubular shape which can be inserted from the opening portion 331, it is possible to restrict the movement of the ring member 531 by the elastic member 533. That is, if the ring member 531 is inserted from the opening portion 331, the compressed and deformed elastic member 533 repels the outer peripheral surface of the ring member main body 531a and the inner peripheral surface of the attached recess portion 332, and the upward and downward movements of the ring member main body 531a in the vertical direction are restricted. Accordingly, it is possible to easily attach the ring member 531 to the protrusion 33 by simply inserting the ring member 531 into the opening portion 331.

Since the pressure gauge 52 is provided, it is possible to detect that the foreign matter G is accumulated on the filter 532 of the collection portion 53 and air cannot sufficiently flow through the filter 532. If the filter 532 of the collection portion 53 is not clogged by the foreign matter G and sufficient air can flow through the filter 532, the valve portion 51 is open and air is supplied from the supply source. Accordingly, air rapidly flows to the inside of the tire T, and the pressure inside the tire T increases to a predetermined pressure within a predetermined time. However, if the filter 532 of the collection portion 53 is clogged by the foreign matter G, sufficient air does not flow from the first flow path F1 to the second flow path F2, and much time is required until pressure increases. Accordingly, since whether or not the pressure inside the tire T reaches a predetermined pressure within a predetermined time is checked by the pressure gauge 52, it is possible to easily check the clogged state of the filter 532 of the collection portion 53. Therefore, it is possible effectively determine a replacement period of the collection portion 53, and it is possible to effectively maintain the collection portion 53.

According to the above-described tire inspection system 100, since the tire holding apparatus 1 including the collection portion 53 is used, processes, in which mounting, air supply, measurement, air discharging, and removal are sequentially performed on the tire T which is a measurement object, can be continuously and stably performed on the plurality of tires T.

Second Embodiment

Figure 4:
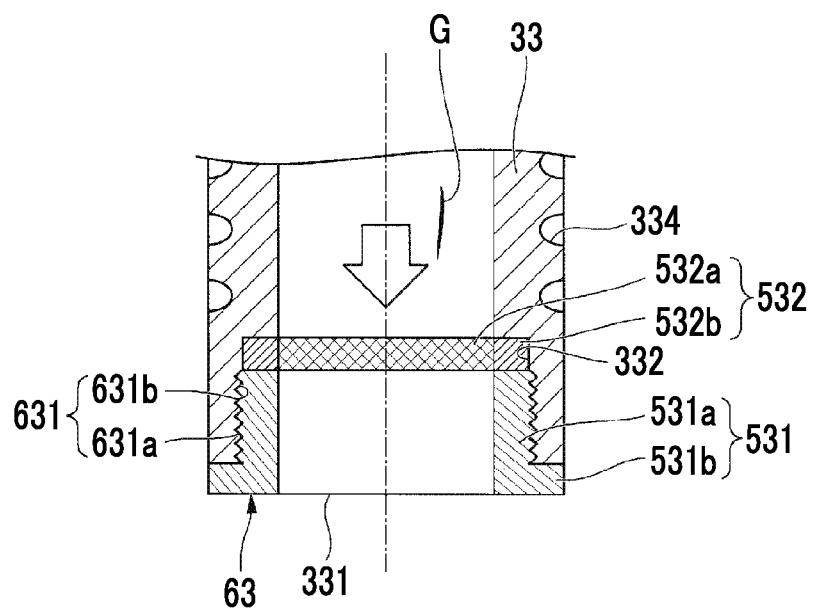
FIG. 4 is a sectional view explaining a collection portion in a second embodiment of the present invention.

Next, with reference to FIG. 4, a collection portion 63 of a second embodiment will be described.

In the second embodiment, the same reference numerals are assigned to the same components as those of the first embodiment, and detail descriptions thereof are omitted. The attachment structure of the collection portion 63 of the second embodiment with respect to the opening portion 331 is different from that of the first embodiment.

The collection portion 63 of the second embodiment includes an engagement portion 631 in which the outer peripheral surface of the ring member 531 and the inner peripheral surface of the protrusion 33 engage with each other, and the engaged state can be released by relative rotation. Specifically, the engagement portion 631 of the present embodiment is configured of a spiral protruded portion 631a which is formed on the outer peripheral surface of the ring member main body 531a and a spiral recessed portion 631b which is formed on the inner peripheral surface of the attached recess portion 332.

The spiral protruded portion 631a spirally protrudes toward the flanged portion 531b side from the end portion of the side on the outer peripheral surface of the ring member main body 531a on which the flanged portion 531b is not formed.

The spiral recessed portion 631b has a shape corresponding to the spiral protruded portion 631a. The spiral recessed portion 631b of the present embodiment is spirally recessed on the inner peripheral surface of the attached recess portion 332 upward in the vertical direction from the lower leading end in the vertical direction.

Next, the operation of the tire holding apparatus 1 of the second embodiment will be described. In the above-described tire holding apparatus 1, after the filter 532 is fitted into the attached recess portion 332 from the opening portion 331, the ring member 531 is inserted from the opening portion 331 while being rotated relatively to the protrusion 33. Since the ring member 531 is inserted while being rotated relatively to the protrusion 33, the spiral protruded portion 631a formed on the outer peripheral surface of the ring member main body 531a engages with the spiral recessed portion 631b formed on the inner peripheral surface of the attached recess portion 332. As a result, the ring member 531 is fixed to the opening portion 331 such that the filter 532 is interposed therebetween, and the collection portion 63 is attached.

According to the above-described collection portion 63, since the ring member 531 is inserted while being rotated relatively to the protrusion 33, the spiral protruded portion 631a formed on the outer peripheral surface of the ring member main body 531a can engage with the spiral recessed portion 631b formed on the inner peripheral surface of the attached recess portion 332. By extracting the ring member 531 while rotating the ring member 531 relatively to the protrusion 33, it is possible to release the engagement state between the spiral recessed portion 631b and the spiral protruded portion 631a. That is, since the spiral recessed portion 631b and the spiral protruded portion 631a engage with each other and the engagement state is released by the relative rotation, it is possible to easily attach the ring member 531 to the protrusion 33. If the spiral recessed portion 631b and the spiral protruded portion 631a are not rotated relatively to each other, the engagement state is not released. Accordingly, it is possible to more firmly attach the collection portion 63 to the opening portion 331.

Third Embodiment

Figure 5:
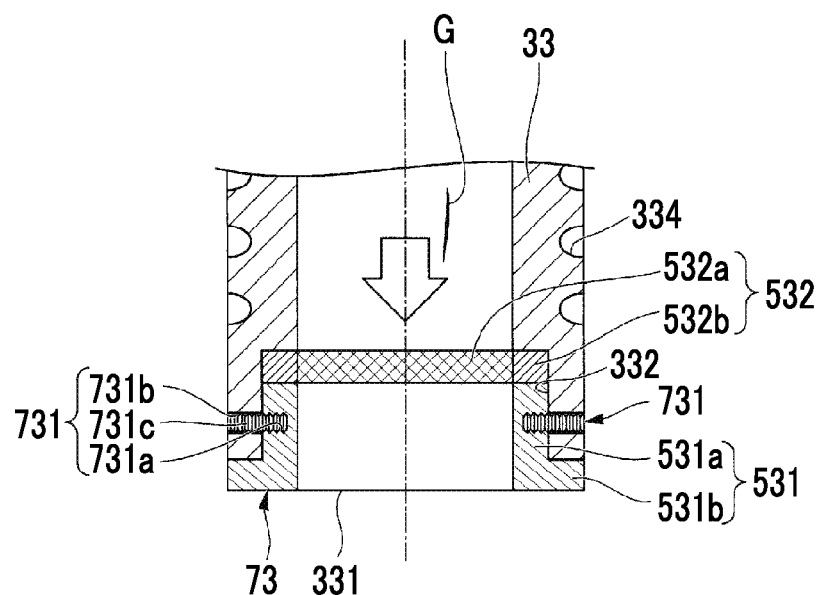
FIG. 5 is a sectional view explaining a collection portion in a third embodiment of the present invention.

Next, with reference to FIG. 5, a collection portion 73 of a third embodiment will be described.

In the third embodiment, the same reference numerals are assigned to the same components as those of the first and second embodiments, and detail descriptions thereof are omitted. The attachment structure of the collection portion 73 of the third embodiment with respect to the opening portion 331 is different from that of the first and second embodiments.

The collection portion 73 of the third embodiment includes a restriction portion 731 which restricts the movement of the ring member 531 with respect to the opening portion 331 from the outside of the protrusion 33. Specifically, the restriction portion 731 of the present embodiment includes screw hole portions 731a which are formed in a ring member main body 531a, screw insertion holes 731b which are formed on the protrusion 33, and screw members 731c which are restriction members.

The screw hole portions 731a are formed so as to be recessed from the outer peripheral surface of the ring member main body 531a. The screw hole portions 731a are formed at two locations facing each other in a state where the central axis of the ring member main body 531a is interposed therebetween. The screw hole portions 731a are perpendicularly recessed from the outer peripheral surface so as to be orthogonal to the central axis of the ring member main body 531a, and screws are formed in the screw hole portions 731a.

The screw insertion holes 731b are formed so as to penetrate from the outer peripheral surface of the protrusion 33 to the inner peripheral surface thereof. The screw insertion holes 731b are formed at positions corresponding to the screw hole portions 731a. Specifically, the screw insertion holes 731b of the present embodiment are formed at two locations facing each other in the state where the central axis of the protrusion 33 is interposed therebetween so as to be disposed at the same positions in the state where the ring member 531 is inserted into the opening portion 331. The screw insertion holes 731b are formed so as to perpendicularly penetrate the outer peripheral surface to be orthogonal to the central axis of the protrusion 33. Each of the screw insertion holes 731b is formed as a hole having slightly sectional shape than that of the screw member 731c such that the screw member 731c can be inserted into the screw insertion hole 731b.

As the screw member 731c of the present embodiment, a set screw is used in which a size of a screw head and a size of a screw portion are the same as each other. The screw member 731c is formed so as to be screwed to the screw hole portion 731a. The screw member 731c of the present embodiment is formed so as to have a length in which the screw member 731c does not protrude from the outer peripheral surface of the protrusion 33 in a state where the ring member 531 is fitted into the opening portion 331, and the screw member 731c is inserted into the screw insertion hole 731b and screwed to the screw hole portion 731a.

Next, the operation of the tire holding apparatus 1 of the third embodiment will be described.

In the above-described tire holding apparatus 1, after the filter 532 is fitted into the attached recess portion 332 from the opening portion 331, the ring member 531 is inserted from the opening portion 331 while the screw hole portions 731a are adjusted so as to be disposed at positions at which the screw hole portions 731a communicate with the screw insertion holes 731b. In the state where the screw hole portions 731a and the screw insertion holes 731b communicate with each other, the screw members 731c are inserted from the outer peripheral surface side of the protrusion 33 into the screw insertion holes 731b, and are screwed to the screw hole portions 731a. As a result, the movement of the ring member 531 is restricted at the position at which the filter 532 is interposed between the opening portion 331 and the ring member 531, and the collection portion 73 is attached.

According to the above-described collection portion 73, in the state where the ring member 531 is inserted from the opening portion 331, the screw members 731c inserted into the screw insertion holes 731b are screwed to the screw hole portions 731a. Accordingly, it is possible to restrict the movement of the ring member 531 with respect to the protrusion 33 from the outside. Therefore, it is possible to easily restrict the movement of the ring member 531 with respect to the protrusion 33 from the outside by the screw members 731c. Only when the screw members 731c are removed from the outside to release the restriction, it is possible to move the ring member 531. Therefore, it is possible to more firmly attach the collection portion 73 to the opening portion 331.

Fourth Embodiment

Figure 6:
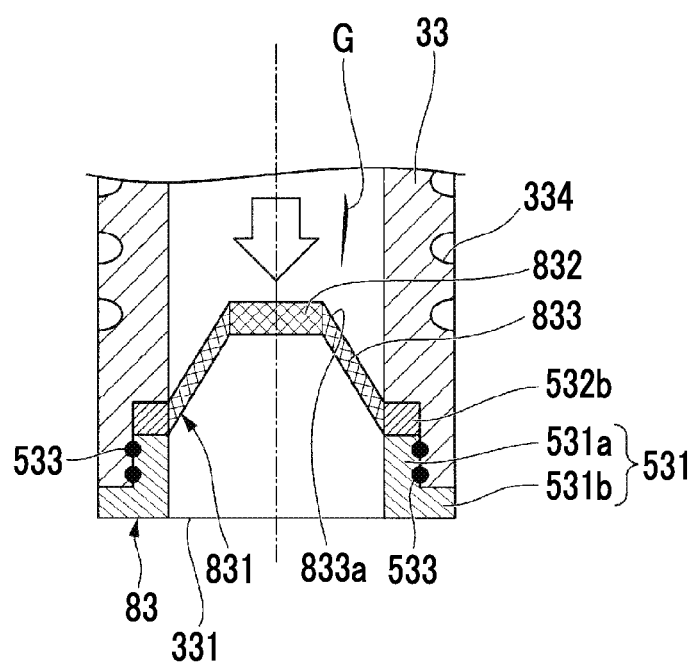
FIG. 6 is a sectional view explaining a collection portion in a fourth embodiment of the present invention.

Next, with reference to FIG. 6, a collection portion 83 of a fourth embodiment will be described.

In the fourth embodiment, the same reference numerals are assigned to the same components as those of the first to third embodiments, and detail descriptions thereof are omitted. In the collection portion 83 of the fourth embodiment, the shape of the filter 532 is different from those of the first to third embodiments.

In the collection portion 83 of the fourth embodiment, instead of the filter 532, a protruded filter 831 protruding toward the upper support portion main body side is provided. The protruded filter 831 of the present embodiment includes a horizontal filter 832 which is horizontally formed so as to be orthogonal to the flow direction of air flowing through the second flow path F2, an inclination filter 833 which is formed so as to be inclined to the flow direction of air flowing through the second flow path F2, and the edge portion 532b which covers the outer peripheral side of the inclination filter 833 and is the same as that of the first embodiment.

The horizontal filter 832 is formed on the top of the protruded filter 831. The horizontal filter 832 of the present embodiment is formed in a disk shape about the central axis of the protrusion 33 in a state where the protruded filter 831 is attached to the opening portion 331. Similarly to the filter main body 532a of the first embodiment, the horizontal filter 832 is formed in a net shape having a predetermined degree of roughness capable of collecting the foreign matter G remaining in the inside of the tire T. In the horizontal filter 832, in order to extract the most amount of air in the vertical direction which is the flow direction of the air flowing through the second flow path F2, the meshes are formed so as to be open in parallel to the vertical direction. Similarly to the first embodiment, in the horizontal filter 832 of the present embodiment, the filter surfaces are disposed so as to face up and down in the vertical direction.

The inclination filter 833 is formed on the inclined side portion of the protruded filter 831. The inclination filter 833 of the present embodiment is a hollow cone shape, and is integrally connected to the outer periphery of the horizontal filter 832 on the upper spindle 3 side. Specifically, in the inclination filter 833 of the present embodiment, an inclined surface 833a is formed, which faces the second flow path F2 and in which the diameter increases toward the outside from the center of the second flow path F2 toward the outer peripheral side on which the edge portion 532b is provided. More specifically, the inclination filter 833 of the present embodiment is formed such that the diameter of the inclination filter 833 increases from the center side toward the outer peripheral side as the inclination filter 833 is from the upper support portion main body 31 toward the leading end of the protrusion 33 in the state where the protruded filter 831 is attached to the opening portion 331. The inclination filter 833 is formed in a net shape having a predetermined degree of roughness capable of collecting the foreign matter G remaining in the inside of the tire T. In the inclination filter 833, in order to extract the most amount of air in the direction orthogonal to the inclined surface 833a, the meshes are formed so as to be open in the direction orthogonal to the inclined surface 833a. Accordingly, like a state where the horizontal filter 832 is disposed so as to be inclined to the vertical direction, in the inclination filter 833 of the present embodiment, the filter surface which is the inclined surface 833a is formed toward the direction orthogonal to the inclined surface 833a.

According to the above-described collection portion 83, in the protruded filter 831, the inclination filter 833 is configured such that the inclined surface 833a inclined from the center of the second flow path F2 toward the outside is formed. Accordingly, the foreign matter G flowing through the second flow path F2 from the upside toward the downside in the vertical direction along with air collide with the inclination filter 833, and roll and fall to the outer peripheral side. Accordingly, the foreign matter G collected by the protruded filter 831 is accumulated so as to be biased toward the outer peripheral side, and a state where small amounts of foreign matters G exist in the vicinity of the center of the second flow path F2 in which the horizontal filter 832 is maintained. Particularly, in the upside of the inclined surface 833a in the vertical direction of the inclination filter 833, the foreign matter G rolls and falls to the outer peripheral surface and is not easily accumulated. Therefore, it is possible to secure a space for allowing air to flow with high accuracy. Accordingly, the space for allowing air to flow is easily secured, and it is possible to more stably supply air.

In the protruded filter 831, the inclined surface 833a of the inclination filter 833 having a net shape in the flow direction of air flowing through the second flow path F2 is disposed so as to be inclined. Accordingly, since air flows through the filter surface which is the inclined surface 833a, it is possible to effectively collect the foreign matter G which flows in along with the air flowing through the second flow path F2 from the upside in the vertical direction. Specifically, since the inclined surface 833a is formed so as to be inclined to the vertical direction, in openings of meshes which are formed on the surface of the inclined surfaces 833a, projected areas of the openings in a case where the openings are viewed in the vertical direction are smaller than the projected areas of the openings in a case where the openings are viewed in the direction orthogonal to the inclined surface 833a. That is, it is possible to make the meshes fine in the vertical direction. Accordingly, the areas of the openings of the meshes with respect to the foreign matter G colliding with the inclination filter 833 from the upside toward the downside in the vertical direction decrease, and the foreign matter G does not easily pass through the inclination filter 833. Meanwhile, since the air can flow so as to enter around the inclination filter 833, even when the sizes of the openings of the meshes in the vertical direction are small and the flow is interfered, a flow rate of the air does not decrease. Accordingly, it is possible to effectively collect the foreign matter G by the filter 532 while securing the flow path of the air.

Hereinbefore, embodiments of the present invention are described in detail with reference to the drawings. However, the components in each embodiment and combinations thereof are example, and addition, omission, replacement, and other modifications of the components may be applied within a scope which does not depart from the gist of the present invention. In addition, the present invention is not limited by the embodiments, and is limited by only claims.

In addition, in the embodiment, the filter 532 or the protruded filter 831 is configured so as to be separated from the ring member 531. However, the present invention is not limited to this configuration, the filter 532 or the protruded filter 831 may be attached to the opening portion 331 by the ring member 531. For example, the filter 532 or the protruded filter 831 may be configured integrally with the ring member 531. In this way, if the filter 532 or the protruded filter 831 is configured integrally with the ring member 531, since it is possible to attach the filter 532 or the protruded filter 831 to each ring member 531, work such as replacement is easily performed.

In the embodiments, the filter 532 or the protruded filter 831 has a net shape. However, the present invention is not limited to this structure, and the filter 532 or the protruded filter 831 has any structure in the opening portion 331 as long as the foreign matter G having a size required to be removed can be collected while air flows.

In the present embodiment, in the filter 532 or the protruded filter 831, the filter main body 532a and the edge portion 532b are configured so as to be separated from each other. However, the present invention is not limited to this configuration. For example, the filter main body 532a, the horizontal filter 832, or the inclination filter 833 is configured of a filter such as a hard porous body, and if necessary rigidity is obtained, a separate member such as the edge portion 532b may be removed.

In addition, a falling-out prevention portion for preventing the collection portions 53, 63, 73, and 83 from being deviated from the opening portion 331 and falling down from the protrusion 33 may be provided. For example, like the first embodiment or the fourth embodiment, in the case where the ring member 531 is press-fitted into the opening portion 331 using the elastic member 533, by connecting the ring member 531 and the protrusion 33 to each other using a falling-out prevention portion such as a chain or a wire, even when the ring member 531 is deviated, it is possible to prevent the ring member 531 from falling down from the protrusion 33.

Moreover, the attachment structures of the collection portions 53, 63, 73, and 83 are not limited to the above-described structures. For example, the collection portions 53, 63, 73, and 83 may be formed integrally with the protrusion 33 in the opening portion 331, and may be attachable to and detachable from the protrusion 33 using a separate member. In addition, in a case where the collection portion 73 of the third embodiment is attachable and detachable, the restriction member with respect to the restriction portion 731 may be an extensible protruding portion such as a plunger, instead of the screw member 731c.

In addition, the apparatus using the tire holding apparatus 1 of the embodiments is not limited to the tire uniformity machine. For example, the tire holding apparatus 1 may be used in other tire inspection systems such as a tire balance measurement apparatus measuring balance of a tire, or an apparatus such as a vulcanizing machine or a PCI apparatus in which the tire T is supported by the lower rim 24 and the upper rim 34, and air is supplied to the inside of the tire T or air inside the tire T is discharged.

INDUSTRIAL APPLICABILITY

The present invention relates a tire holding apparatus and a tire inspection system provided with the tire holding apparatus. Accordingly, it is possible to collect foreign matter by a collection portion, and it is possible to stably supply air to and discharge air from a held tire.

REFERENCE SIGNS LIST

T: tire
T1: bead portion
100: tire inspection system
1: tire holding apparatus
2: lower spindle (first support portion)

21: base
22: lower spindle main portion
23: insertion portion
231: insertion hole
24: lower rim (first rim)
241: lower rim attachment portion
242: lower rim main portion
242a: lower rim pressing surface
242b: lower rim cylindrical portion
3: upper spindle (second support portion)
31: upper support portion main body
32: lifting and lowering mechanism
321: frame
322: ball screw
324: rim elevator
33: protrusion
331: opening portion
332: attached recess portion
333: flow hole
334: engagement groove
34: upper rim (second rim)
341: upper rim attachment portion
342: upper rim main body
342a: upper rim pressing surface
342b: upper rim cylindrical portion
4: connection portion
41: engagement piece
5: air supply and discharging portion
F1: first flow path
F2: second flow path
51: valve portion
52: pressure gauge
G: foreign matter
53, 63, 73, 83: collection portion
531: ring member
531a: ring member main body
531b: flanged portion
532: filter
532a: filter main body
532b: edge portion
533: elastic member
10: measurement section
11: load wheel
12: rail
631: engagement portion
631a: spiral protruded portion
631b: spiral recessed portion
731: restriction portion
731a: screw hole portion
731b: screw insertion hole
731c: screw member
831: protruded filter
832: horizontal filter
833: inclination filter
833a: inclined surface

The invention claimed is:

1. A tire holding apparatus, comprising:
a first support portion to which a first rim supporting one side of a tire is attached;
a second support portion to which a second rim supporting the other side of the tire is attached; and
an air supply and discharging portion which is connected to a supply source for supplying air, supplies air to the inside of the tire supported by the first rim and the second rim, and discharges the air supplied to the inside of the tire outside of the tire,
wherein the second support portion includes a protrusion which protrudes toward the first support portion,
wherein the first support portion includes an insertion portion into which the protrusion is inserted, and
wherein the air supply and discharging portion includes,
a first flow path which is formed so as to penetrate the insertion portion and allows the air to flow,
a second flow path which allows the air flowing through the first flow path to flow from an opening portion formed on a leading end of the protrusion to the inside of the tire, and
a collection portion which is provided in the opening portion and collects foreign matter which is mixed into the second flow path from the inside of the tire, and
wherein the collection portion is provided between the first flow path and the second flow path.

2. The tire holding apparatus according to claim 1,
wherein the collection portion is provided to be attachable to and detachable from the opening portion.

3. The tire holding apparatus according to claim 2,
wherein the collection portion includes a ring member which is attachable to and detachable from the opening portion, and a filter which is attached to the opening portion by the ring member.

4. The tire holding apparatus according to claim 3,
wherein the protrusion protrudes in a tubular shape from the second support portion,
wherein the ring member is formed in a tubular shape and inserted into the opening portion, and
wherein the collection portion includes an elastic member which is attached in a state of being compressed and deformed between an outer peripheral surface of the ring member and an inner peripheral surface of the protrusion.

5. The tire holding apparatus according to claim 3,
wherein the protrusion protrudes in a tubular shape from the second support portion,
wherein the ring member is formed in a tubular shape and inserted into the opening portion, and
wherein the collection portion includes engagement portions, which can engage an inner peripheral surface of the protrusion and an outer peripheral surface of the ring member and can release the engagement state by the inner peripheral surface and the outer peripheral surface being rotated relative to each other, on the inner peripheral surface and the outer peripheral surface.

6. The tire holding apparatus according to claim 3,
wherein the protrusion protrudes in a tubular shape from the second support portion,
wherein the ring member is formed in a tubular shape and inserted into the opening portion, and
wherein the collection portion includes a restriction portion which restricts movement of the ring member with respect to the opening portion from the outside of the protrusion.

7. The tire holding apparatus according to claim 3,
wherein an inclined surface, which faces the second flow path and is inclined in a flow direction of the air flowing through the second flow path, is formed on the collection portion.

8. A tire inspection system, comprising:
the tire holding apparatus according to claim 1; and
a measurement device which measures characteristics of the tire supported by the first rim and the second rim.

* * * * *